United States Patent [19]

Hunold et al.

[11] Patent Number: 5,055,983
[45] Date of Patent: Oct. 8, 1991

[54] REAR-LIGHT ASSEMBLY FOR MOTOR VEHICLE

[75] Inventors: Franz-Josef Hunold, Lippstadt; Heinrich Schafter, Geseke; Michael Dreger, Lippstadt, all of Fed. Rep. of Germany

[73] Assignee: Hella KG Hueck & Co., Fed. Rep. of Germany

[21] Appl. No.: 642,037

[22] Filed: Jan. 16, 1991

[30] Foreign Application Priority Data

Feb. 13, 1990 [DE] Fed. Rep. of Germany ... G9001659.9

[51] Int. Cl.⁵ .............................................. B60Q 1/26
[52] U.S. Cl. ..................................... 362/80; 362/243; 362/245
[58] Field of Search ...................... 362/61, 80, 83, 236, 362/242, 243, 244, 245, 246, 247

[56] References Cited

U.S. PATENT DOCUMENTS

| | | | |
|---|---|---|---|
| 4,268,892 | 5/1981 | Pfeiffer et al. | 362/83 |
| 4,459,644 | 7/1984 | Bailly | 362/83 X |
| 4,851,810 | 7/1989 | Vitale et al. | 362/240 |
| 4,860,174 | 8/1989 | Kato et al. | 362/61 |

FOREIGN PATENT DOCUMENTS 8304195.8 7/1983 Fed. Rep. of Germany.
3320406A1 12/1984 Fed. Rep. of Germany.
3446230A1 7/1985 Fed. Rep. of Germany.
3731705A1 6/1989 Fed. Rep. of Germany.

Primary Examiner—Stephen F. Husar
Attorney, Agent, or Firm—Griffin Branigan & Butler

[57] ABSTRACT

A rear-light assembly for a motor vehicle is positioned at a transition from a rear surface (11) to a side surface (12) of the motor vehicle. A light diffuser thereof (1,2) has an exterior surface which extends relatively smoothly into the rear and side surfaces of the rest of the body of the motor vehicle. Light-diffuser portions (17, 18 and 19) for a brake-light reflector (6), a taillight reflector (7), and a fog taillight reflector (8) are provided with linearly arranged exterior-light reflecting rear-beam prisms (20). In a flat area (18, 19) of the light diffuser, which extends over the fog taillight and taillight, the rear-beam prisms are optically effective while at an adjacent area they are made to be optically ineffective. A light-diffuser portion (15) for a backing light reflector (4) is provided with an opaque lattice, or grill, (21, 22) which includes linearly shaped strips (21). This light-diffuser portion is also in an area of the light diffuser which extends substantially planar, or flat. Optically-ineffective, rear-beam prisms arranged in strips are in light-diffuser portions (16, 24) which are backed by a reflector to the side of the light-diffuser portion for the backing light.

8 Claims, 4 Drawing Sheets

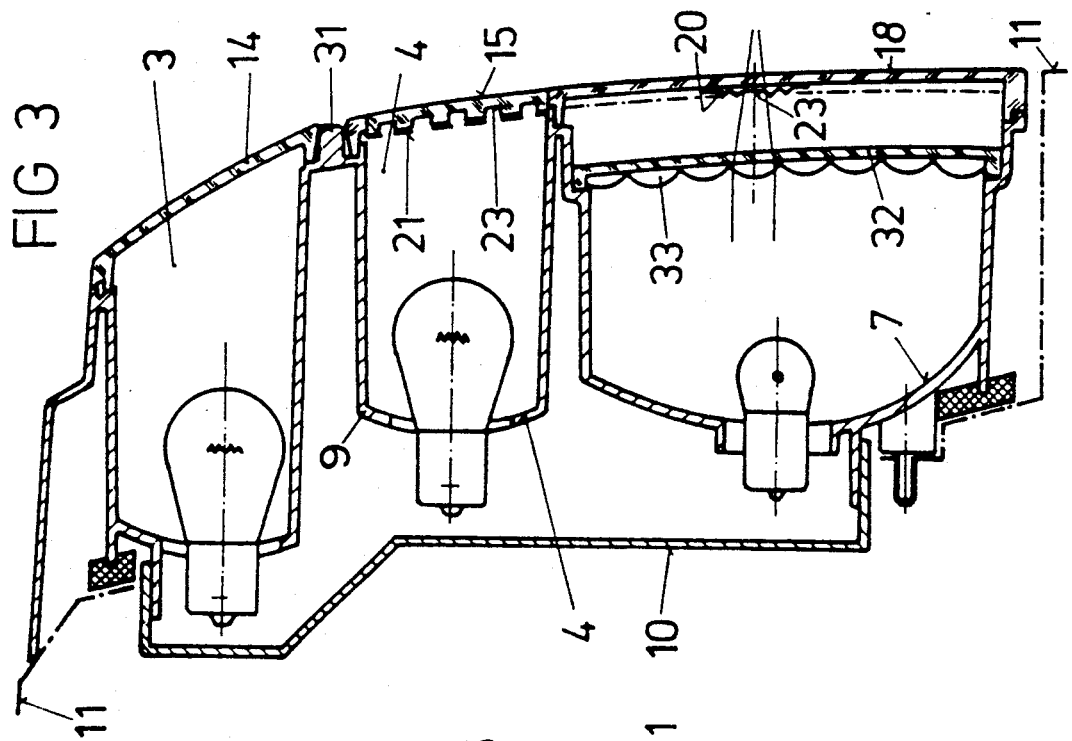
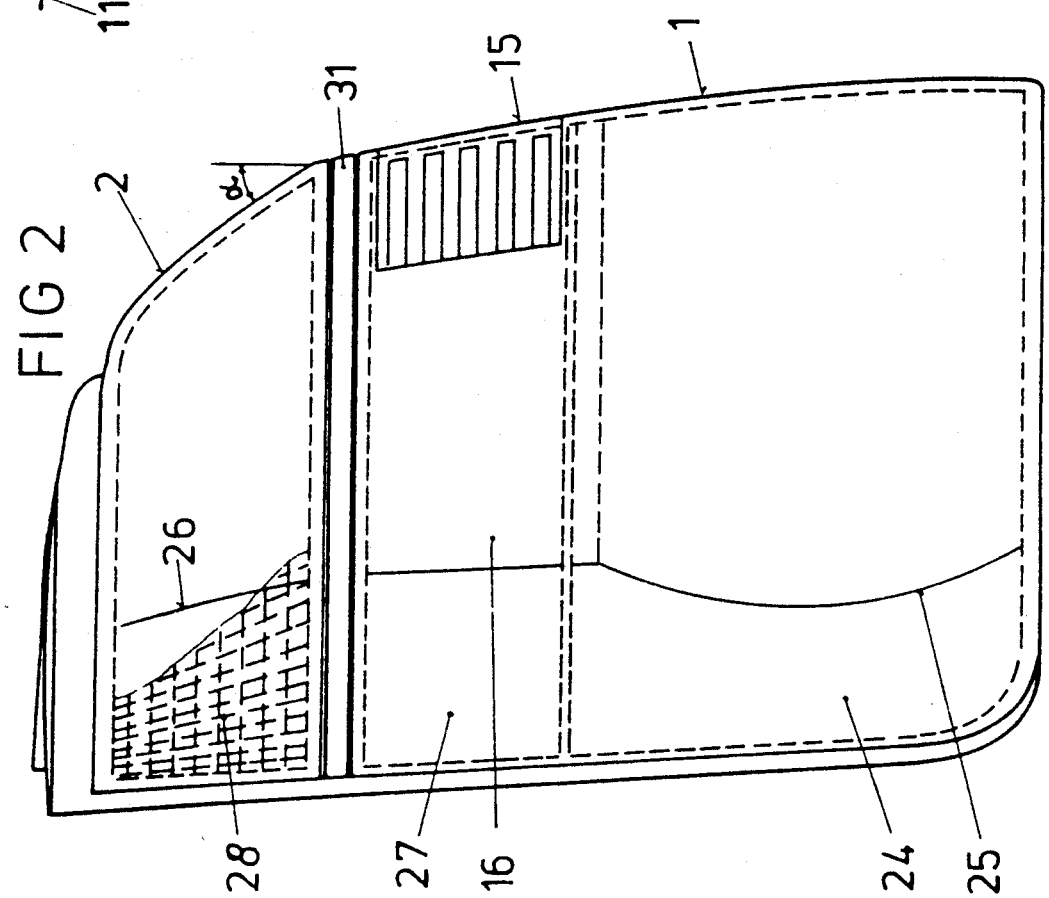

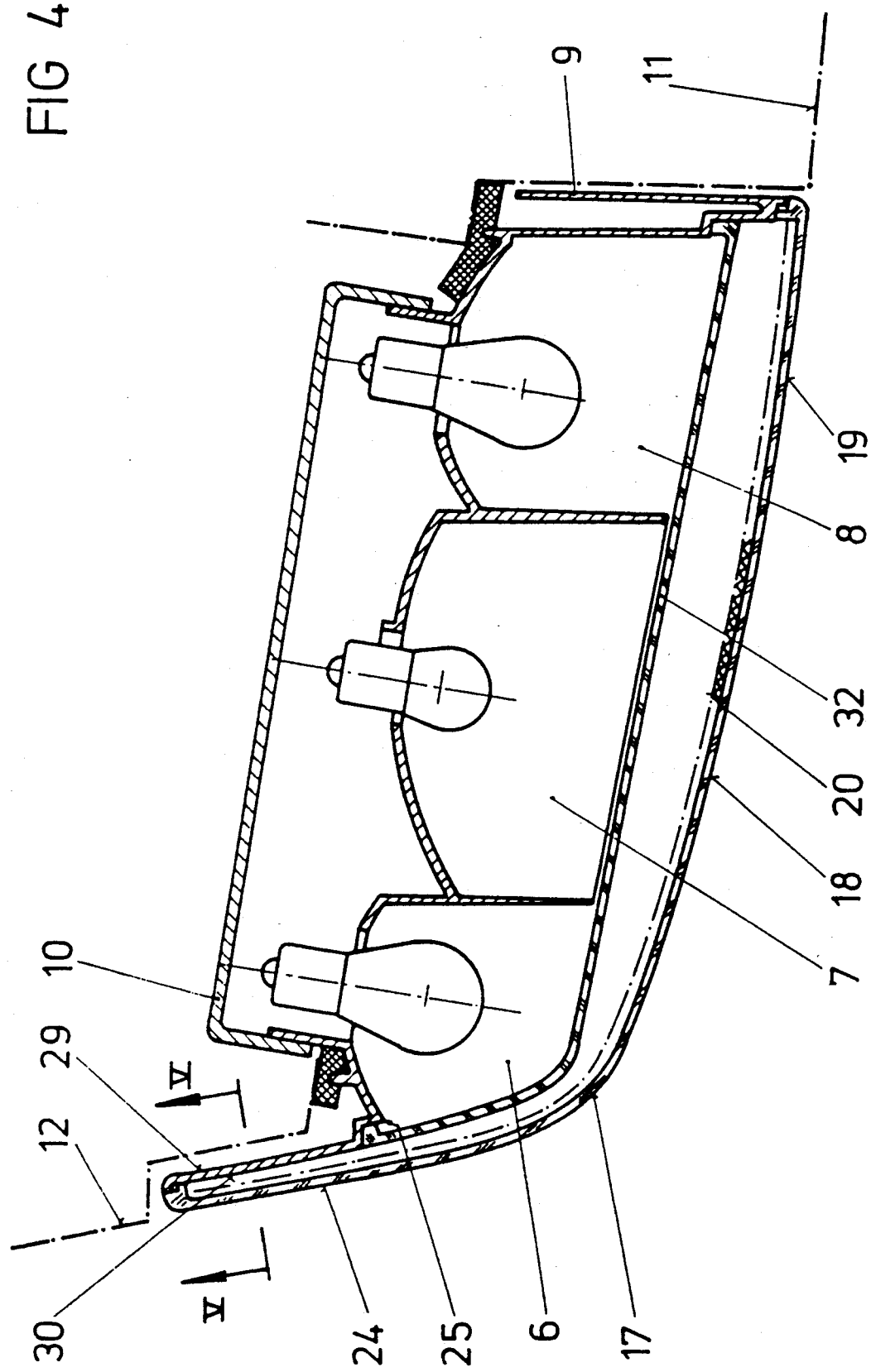

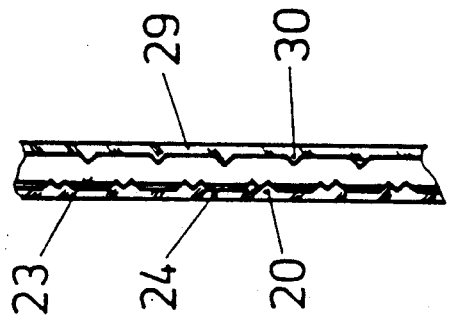
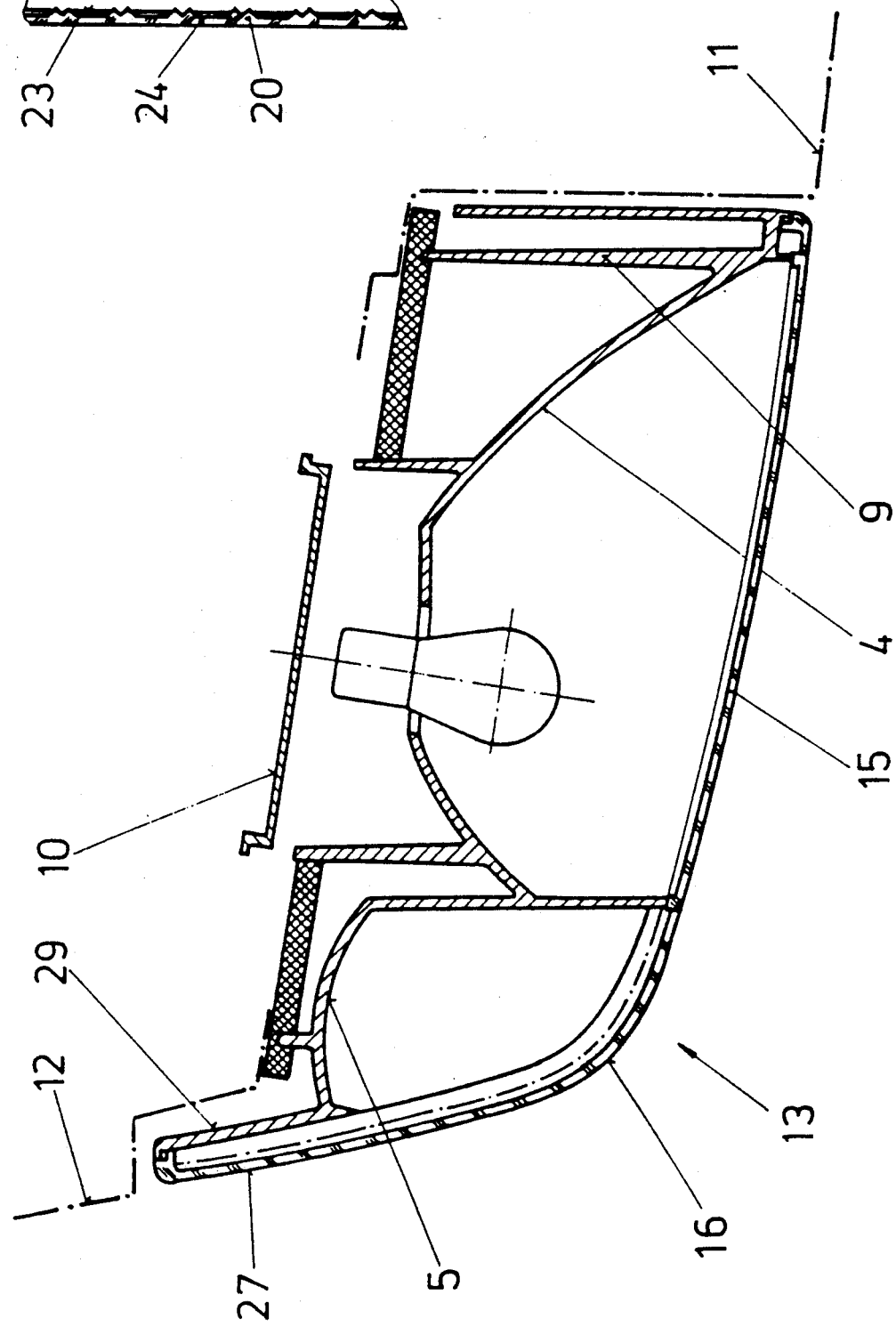

REAR-LIGHT ASSEMBLY FOR MOTOR VEHICLE

BACKGROUND OF THE INVENTION

This invention relates broadly to the art of built-in type rear-light assemblies, and particularly to those at transitions from rear surfaces of vehicles to side surfaces thereof as set forth in a preamble of claim 1 in this application.

Such rear-light assemblies exist in the prior art (see, for example, Geschmacksmuster MR 437, recorded in the District Court of Lippstadt, Germany). There is a continuing effort to create an optimized form of this known rear-light assembly. In doing this, however, there are various controlling technical criteria, particularly optical, which must be observed; such as for example, maximum and minimum light intensity, a particular light distribution, size and location of signal zones of individual signals such as those of a blink light, a brake light, a taillight, a fog taillight, a backing light, and a rear beamer. Moreover, an exterior contour of such a rear-light assembly should smoothly fit into a contour of a motor vehicle body, particularly at a transition from a rear surface of the body to a side surface thereof.

It is an object of this invention to provide a rear-light assembly with large signal surfaces extending into a side surface of a motor vehicle body which has uniformly colored light-diffuser portions exhibiting similar structures and brilliance. In particular, it is an object of this invention to provide a rear-light assembly which, in comparison with known light assemblies, has a backing or back-up light which is improved in operation by broadening its reflector without a color of a corresponding light-diffuser portion standing out too strongly from neighboring light-diffuser portions. This object is carried out by the combined effects of the improvement limitations set forth in claim 1 hereof.

BRIEF DESCRIPTION OF THE DRAWINGS

The foregoing and other objects, features and advantages of the invention will be apparent from the following more particular description of a preferred embodiment of the invention, as illustrated in the accompanying drawings in which reference characters refer to the same parts throughout the different views. The drawings are not necessarily to scale, emphasis instead being placed upon illustrating principles of the invention in a clear manner.

FIG. 2 is a side view of the rear-light assembly of FIG. 1, perpendicular to a side surface of the motor vehicle;

FIG. 3 is a partially sectional view taken on line A—A in FIG. 1 with other portions of a body of a vehicle on which the rear-light assembly is mounted being shown with dot/dash lines;

FIG. 4 is a partially sectional view taken on line B—B in FIG. 1 with other portions of a body of a vehicle on which the rear-light assembly is mounted being shown with dot/dash lines;

FIG. 5 is a sectional view taken on line C—C in FIG. 4; and

FIG. 6 is a sectional view taken on line D—D in FIG. 1 with other portions of a body of a vehicle on which the rear-light assembly is mounted being shown with dot/dash lines.

DETAILED DESCRIPTION OF THE PREFERRED EMBODIMENT

Figure 1:
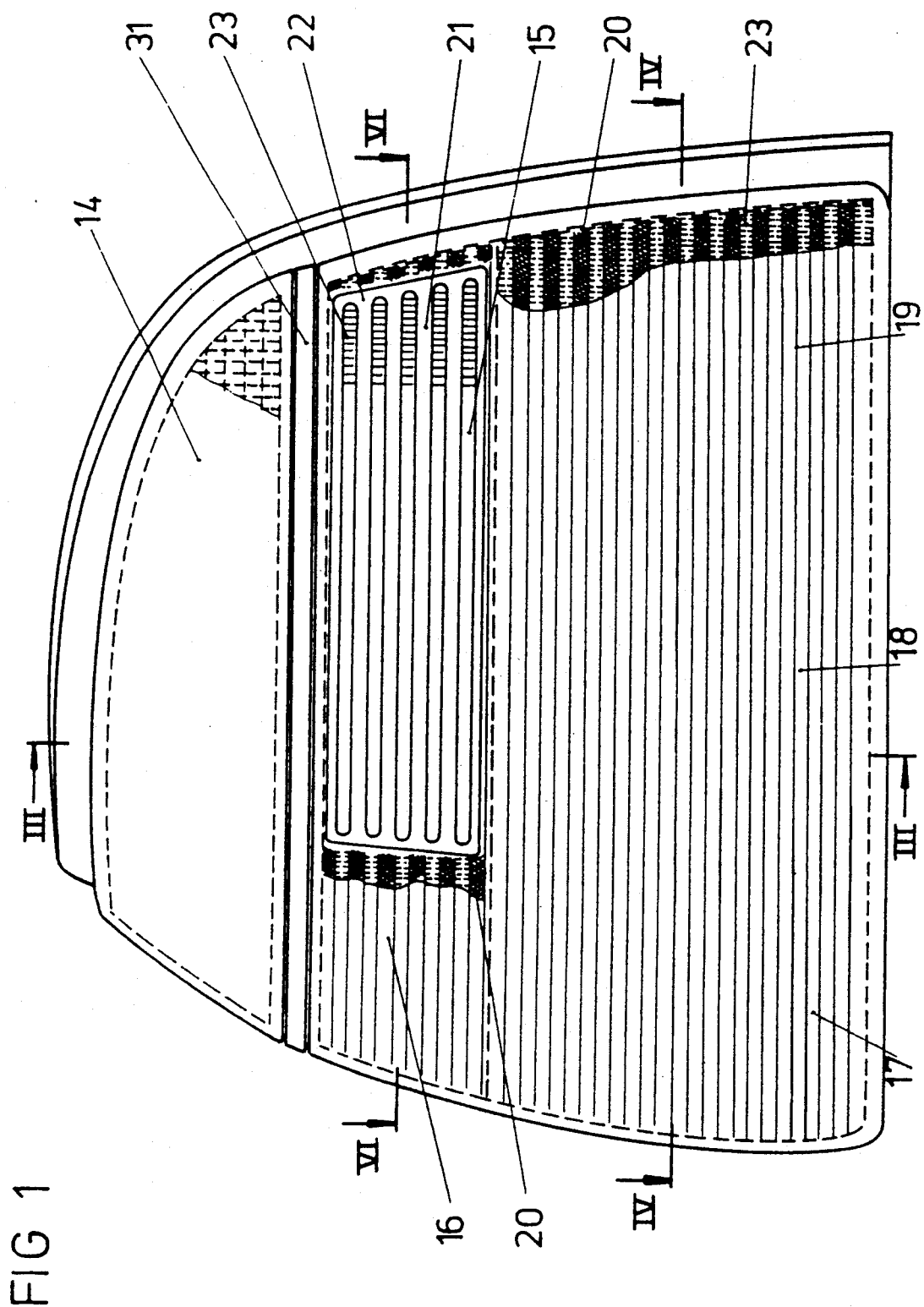
FIG. 1 is a rear view, partially cutaway, of a rear-light assembly of this invention as seen from behind a motor vehicle looking in a driving direction of the motor vehicle.

A light diffuser which is comprised of light-diffuser parts 1 and 2 is mounted on a housing 9 which is formed from reflectors 3, 4, 5, 6, 7, and 8 and is welded thereto. A lamp support 10, which carries lamp bulbs along with electrical contact elements therefor is mounted to the housing from a vehicle-interior side thereof.

The rear-light assembly is constructed so that it can be inserted into an opening of a motor vehicle motor body, or chassis, at a transition from a motor-vehicle rear surface 11 to a motor vehicle side surface 12. In this regard, the exterior surfaces of the light-diffuser parts 1 and 2 are so constructed and positioned that their outer rim, or edge areas nearly precisely terminate with rims or edges defining the vehicle body opening. This provides a light assembly having only the light diffuser being externally visible, which projects a substantially trapezoidal shape when viewed in a driving direction from behind the motor vehicle rear surface 11 and a substantially rectangular shape when viewed from the motor vehicle side surface.

A transition of a rear surface of the light diffuser (1, 2) to its side surface results in the shape of an arch or curve 13, with the light-diffuser part 2 extending in a vertical direction while receding back, or horizontally, at a pointed, or acute, angle $\alpha$.

The rear-light assembly is formed as a so called multi-chamber light in which each signal light is provided with a separate chamber. These chambers are formed from individual reflectors which partially open to the outside, or exteriorly, and are substantially divided from one another. The individual reflectors 3, 4, 5, 6, 7 and 8 respectively correspond to light-diffuser portions 14, 15, 16, 17, 18 and 19 which are provided with optical measures, or device, on interior surfaces thereof. In this regard, the individual reflectors and their correspondingly arranged light-diffuser portions are assigned the following functions. The reflector 3 is for a blink light, the reflector 4 is for a backing, or back up, light, the reflector 6 is for a brake light, the reflector 7 is for a taillight, and the reflector 8 is for a fog taillight. The reflector 5 has no substantial optical function but rather more a stylizing, aesthetic, or decorative, function. This reflector only has the function of reflecting exterior light falling thereon in a similar manner to that of the other reflectors so that a light-diffuser portion 16 in front of the reflector 5 has substantially a uniform brilliance as the other light diffuser portions in front of reflectors.

The light-diffuser portions 15, 18 and 19 have a substantially planar, or flat, extending exterior surface. This is important because foreign-light-reflecting rear-beam triples, or prisms, or retro reflective triples, 20 are arranged in the light-diffuser portions 18 and 19 and opaque strips 21 are arranged on an interior surface of the light-diffuser portion 15. The rear-beam prisms 20 should be located as much as possible in a plane extending perpendicular to a motor vehicle middle axis because in this manner they provide the most effective rearwardly directed beams. The opaque strips 21 are produced in the light-diffuser portion 15 by a stamping, or pressing, process. In this regard, it is advantageous for surfaces receiving the strips to be as flat as possible. The surfaces receiving the strips 21 are raised above their adjacent surface portions so that the strips are attached first in the form of a foil or film and then by pressing or stamping the areas of the foil which lie on the raised areas are separated from the other surfaces. Attachment of the opaque strips 21 to the light-diffuser portion 15 is accomplished by an adhesive which is activated by pressure and/or heat. The color of the opaque strips is red so that the colorless light-diffuser portion 15 for the backing light appears quite red from outside and thereby matches, or fits in, with a color of the light-diffuser portions 17, 18 and 19. In this manner, the light-diffuser portion for the backing light no longer has a striking, or pronounced, colorful difference to a signal red for the brake, tail, or fog taillight. The stripes 21 are connected together by a frame 22 so that an opaque lattice, or grill, results.

The rear-beam prisms (triples or tribels) for producing a rear beam effect of a rear beamer are arranged to run linearly, or in rows. In this regard, these rear-beam-prism lines, or rows, extend across the entire width of the light assembly and indeed over the light-diffuser portions 17, 18 and 19. The rows, or lines, with the rear-beam prisms 20, alternate with rows, or lines, of adjacently bordering, vertically extending, cylindrical lenses 23. These cylindrical lenses 23 scatter horizontally parallel light from the respective reflectors falling thereon. The rear-beam prisms 20 are arranged to have an effective rear-beamer effect only in the light-diffuser portions 18 for the taillight and 19 for the fog taillight. In all other light-diffuser portions, such as in the light-diffuser portion 17 of the brake light as well as an outwardly attached light-diffuser portion 24 and in the sidewardly attached light-diffuser portion 16 on the light diffuser portion 15, these rear-beam prisms are made to be optically ineffective by roughening the three reflection surfaces; that is, external foreign light falling on the rear-beam prisms 20 is not reflected so that it will be thrown back in almost the same direction, rather, it is scattered upon contacting rear beam surfaces of the prisms by means of this roughening. The arrangement of the rear-beam prisms 20 in the light-diffuser portions 16, 17 and 24 is the result of style, or aesthetic considerations. In this manner the light diffuser in these light-diffuser portions is structured substantially as are the light-diffuser portions 18 and 19 for the taillight and the fog taillight.

The openings toward the outside of the reflectors 6 for the brake light and 3 for the blink light extend to a side surface of the light assembly. This is represented by lines 25 and 26. This provides the advantage that the brake light as well as the blink light provide light in a large open angle, indeed extending to the side of the motor vehicle.

Those light diffuser portions 24, 27 and 28 which are connected to the light-diffuser portions 17, 16 and 14 to extend to the side of the motor vehicle are covered by an edge portion 29 of the housing 9 which is bowed back at an obtuse angle to be approximately uniformly spaced from the respective light-diffuser portions and which has a silver color to improve its reflective capabilities. In this manner, the light diffuser in these areas has a similar brilliance as in other areas which are backed up by reflectors. In order to make the brilliance match that of the other light-diffuser portions this bowed back edge portion 29 is provided with prisms, or ribs, 30 on an exterior surface thereof which reflectively scatter exterior light falling thereon.

A flange 31, which is part of the housing 9 extends between the light-diffuser parts 1 and 2. This flange 31 divides the light-diffuser portion 14 of the blink light from the light-diffuser portion 15 of the backing light and the adjacently positioned light-diffuser portion 16. Also, it provides a bearing surface to attach the light-diffuser portions bordered thereon.

An optical lens 32 is placed in series with the light-diffuser portions 17 for the brake light, 18 for the taillight, and 19 for the fog taillight which has horizontally extending cylindrical lenses 33 thereon. These linearly arranged, adjacent, cylindrical lenses collect parallel directed light impinging thereon in such a manner that it bundles it between the linearly extending rear-beam prisms. These cylindrical lenses 33 simultaneously provide for a fully vertical scattering of the brake light, taillight, and fog taillight?

It will be appreciated by those skilled in the art that the rear-light assembly recited in claim 1 provides a broad reflector for a backing or reverse-drive light without a color of a corresponding light diffuser portion standing out too strongly from neighboring light-diffuser portions.

It is beneficial that the light diffuser portion for the blink light extends upwardly while receding back, or horizontally, to form an acute or pointed angle. In this manner, it is possible to make an exterior contour of the light assembly fit an exterior contour of a vehicle body without a light diffuser portion having a rear beamer being arranged on a slant and/or not being made to extend substantially in a plane.

The substantially flat shape of the rear surface of the light diffuser provides a benefit for the light-diffuser portion for the backing light. In this manner, it is easily possible for the opaque stripes to be applied to the light-diffuser portion of the backing light by adhesion or by means of a stamping method through pressure and/or heat.

In order to simplify attachment of the light diffuser to the light assembly housing by means of welding, it is beneficial for the light-diffuser portion of the blink light to be constructed as a separate part, whereby the remaining light-diffuser portion is produced by one-part injection molding, and further to arrange a flange of the housing formed by reflectors between these two light-diffuser parts. In this manner, it is possible to bring a welding tool to welding positions from various different directions whereby not only a simple weld of the light diffuser with the housing is accomplished but a dependable one as well.

Further, it is helpful when an optical lens having cylindrical adjacent lenses linearly arranged thereon is placed in series with at least those light-diffuser portions which are impinged on by light reflected from the reflectors and which have rear-beam prisms thereon. In this manner, substantially all of the light directed by the reflectors shines through light-transmitting areas of these light-diffuser portions. It is helpful to mount the optical lens on the housing formed from the reflectors so that its exterior surface extends smoothly into an exterior surface of a doubled back, or bowed back, rim of the housing formed from the reflectors. A step between these parts would appear as a darker stripe. In order to give these directly adjacent surfaces, namely, the exterior surface of the bowed back edge portion of the housing and the exterior surface of the optical lens, an approximately uniform surface brilliance, it is beneficial, according to another aspect of the invention, to provide ribs or grooves on the exterior surface of the bowed back edge portion which reflectively scatters light falling thereon.

The embodiments of the invention in which an exclusive property or privilege are claimed or defined are as follows:

1. In a built-in type rear-light assembly at a transition from a rear surface to a side surface, said rear-light assembly being of a type having:
  a light-diffuser, which in a built-in position when viewed in a driving direction from the rear of a motor vehicle, projects substantially a trapezoidal shape and when viewed from a side of the motor vehicle projects substantially a rectangular shape, with the light-diffuser extending in a curve at the transition from the rear surface into the side surface;
  a light-assembly housing including respectively a reflector for each of a blink light, brake light, taillight, fog taillight, and reverse-drive light with light from the blink light exiting through an upper light-diffuser portion and light from the brake light, taillight and fog taillight exiting through adjacent light-diffuser portions at a common lower height level, with taillight and a fog taillight light-diffuser portions extending in a substantially planar surface while the brake-light light-diffuser portion at least partially lies in the curve at the transition from the rear surface to the side surface, with the taillight light-diffuser portion having a rearward beamer comprised of foreign-light-reflecting rear-beam prisms arranged in lines which alternate with lines which are occupied by vertically extending cylindrical lenses;
  with areas of the light diffuser extending to the sidewall of the motor vehicle being covered by an approximately uniformly-spaced edge portion of the housing bowed back at a substantially obtuse angle which is light reflective;
  the improvement wherein:
  a) the blink-light extends over an entire width of the rear-light assembly;
  b) the reflector for the blink light extends over the entire width of the rear surface of the light diffuser portion for the blink light and substantially into a side surface area of this light-diffuser portion;
  c) the linear rear-beam prisms and the cylinder lenses therebetween in the lower region of the light-diffuser extend from edge to edge substantially over the entire width of the light-diffuser;
  d) the linear rear-beam prisms in those portions of the light diffuser extending sidewardly from the reflectors for the taillight and rear fog light being made to be optically ineffective;
  e) a rear-light assembly includes a middle portion for creating a backing light creating portion located between an upper blink-light creating portion and lower brake-, tail-, and fog-light creating portion;
  f) a reflector for creating the backing light extends from an inner side edge of the rear-light assembly to a beginning of the curved shaped transition of the light diffuser from its rear surface to its side surface;
  g) a portion of the light diffuser covering a reflector for backing light, and being of a size corresponding to light exiting from this reflector, is provided with linear opaque strips;
  h) lines lying between the opaque strips are occupied by vertically-extending cylindrical lenses;
  i) the opaque strips have approximately the same color as the diffuser portions for the brakelight, taillight, and fog taillight;
  j) the light-diffuser portion lying to the side of, but near, the backing light creating portion has an optical structure corresponding to the brake-light light-diffuser portion positioned thereunder; and
  k) a portion of the light diffuser lying to a side of the backing light-diffuser portion and above the brake-light light-diffuser portion is backed up by a sidewardly enclosed reflector.

2. In a rear-light assembly as in claim 1 wherein the light-diffuser portion for the blink light extends upwardly at an acute angle $\alpha$.

3. In a rear-light assembly as in claim 1 wherein the opaque strips in the backing portion of the light-diffuser are adhered or stamped thereon by means of pressure or heat.

4. In a rear-light assembly as in claim 1 wherein the light-diffuser portion for the blink light is a separate part and other portions of the light-diffuser are joined together into a separate part by an injection molding process and wherein a flange on a housing including the reflectors extends between the two separate parts.

5. In a rear-light assembly as in claim 1 wherein at least those portions of the light diffuser which are impinged on by light reflected from the brake light, taillight and fog taillight reflectors, and which are occupied by rear-beam prisms, are arranged in series with an optical lens which is occupied by linearly formed adjacent cylindrical lenses.

6. In a rear-light assembly as in claim 5 wherein an optical lens is placed on a housing formed by the reflectors so that an exterior surface thereof leads substantially smoothly into an exterior surface of the edge portion of the housing which is bowed back at a substantially obtuse angle.

7. In a rear-light assembly as in claim 6 wherein the exterior surface of the bowed back edge portion of the housing is provided with ribs or grooves which reflectively scatter light falling thereon.

8. In a rear-light assembly as in claim 1 wherein the rear-beam prisms in the light diffuser portions not serving as a taillight and fog taillight are made to be optically ineffective by roughening.

* * * * *